Patented July 15, 1941

2,249,686

UNITED STATES PATENT OFFICE 2,249,686

POLYMERIC MATERIAL

Harry B. Dykstra, Wilmington, Del., assignor to E. I. du Pont de Nemours & Company, Wilmington, Del., a corporation of Delaware No Drawing. Application September 29, 1938, Serial No. 232,465

4 Claims. (Cl. 260—3)

This invention relates to polymeric materials, and more particularly to plasticized polyamide compositions.

An object of this invention is to prepare new compositions useful in making filaments, bristles, rods, tubes, ribbons, films, sheets, and the like. Another object is to improve the properties, particularly the moisture permeability and pliability of the synthetic linear superpolyamides and the articles derived therefrom. A still further object is to improve the oil resistance of certain rubber-like materials.

These and other objects as will be apparent from the following discussion are accomplished by incorporating in the superpolyamide rubber or rubber-like materials comprising polymeric aliphatic hydrocarbons and polymeric halogenated hydrocarbons.

The fiber-forming or superpolyamides used in the practice of this invention are those described in Patents 2,071,250, 2,071,253, and 2,130,948. In these polyamides the amide group forms an integral part of the main chain of atoms in the polymer. A characteristic property of these polymers is that they can be formed into filaments which can be cold drawn to fibers showing molecular orientation along the fiber axis. The polyamides are of two types, those obtainable from polymerizable monoaminomonocarboxylic acids and their amide-forming derivatives, and those obtainable by condensation polymerization of suitable diamines with suitable dibasic carboxylic acids or amide-forming derivatives of dibasic carboxylic acids. It is to be understood that mention herein of the above identified acids refers also to their equivalent amide-forming derivatives. It will be noted that the polyamides are derived from bifunctional amide-forming reactants. On hydrolysis with mineral acids the polyamides revert to the bifunctional reactants from which they are derived. For example, a polyamide derived from a diamine and a dibasic acid yields, on hydrolysis with hydrochloric acid, the dibasic acid and the diamine hydrochloride.

Although synthetic linear polyamides as a class are microcrystalline and have fairly high and sharp melting points, they can be formed into many useful objects without the use of solvents or plasticizers. This is accomplished by spinning, extruding, or otherwise forming the objects from the molten polyamides. To improve the properties of the products thus formed, it is generally desirable to subject them to a process of cold drawing (application of tensile stress) or to a process of cold working (application of compressive stress), e. g. cold rolling, or by subjecting them to both cold drawing and cold working. The products thus formed are unusually strong, have high melting points, and for many purposes are sufficiently pliable. For certain uses, however, and particularly for use in the form of films, sheets, and the like, greater pliability is sometimes desired.

It has now been found that products of lower moisture permeability and increased pliability can be obtained from the superpolymer by incorporating therein natural and synthetic rubbers. For most purposes quantities of the rubber ranging from 1 to 75% by weight of the superpolymers are used to greatest advantage, the amount used depending on the nature of the rubber material and on the properties required in the final product. Larger quantities of rubber, for instance equal parts rubber and polyamide, as mentioned in Examples I and III are useful when greater pliability together with less water absorption is desired. It is often advantageous to incorporate small quantities of a superpolymer. For example, the addition of 25% of certain superpolymers greatly improves the oil resistance of natural rubber. Furthermore, by incorporating small amounts of superpolymer, the undesirably low softening temperatures of certain synthetic polymeric aliphatic hydrocarbons such as polyisobutylene may be raised. A convenient method for incorporating the rubber material consists in stirring it in the fused superpolymer. When this is done it is usually desirable to exclude oxygen since this tends to darken the superpolymer. Another method consists in adding the rubber material to the monomeric reactants, e. g. the diamine and dibasic acid from which the superpolymer is prepared. Still another method consists in milling a mixture of the two materials on heated rolls.

The invention is described more specifically in the following examples in which parts are by weight.

*Example I*

Thirty-four and eighty-three hundreds (34.83) parts of hexamethylenediamine, 627.87 parts of sebacic acid, and 297.95 parts of 2,2-dimethyl-1,3-propanediol were heated for five hours at 200° C. at atmospheric pressure, then for sixty-seven hours at 200° C. under 25 mm. pressure, and finally for 216 hours at 250° C. under 3 mm. pressure. A slow stream of carbon dioxide was bubbled through the mixture during the entire heating period. This superpolymer, an ester-amide interpolymer, melted at about 100° C., had an intrinsic viscosity of about 0.63, and a melt visvosity of 3500 to 4000 poises.

Fifty (50) parts of this polymer, 50 parts of a 30-minute milled smoked rubber, 2.5 parts of zinc oxide, 1 part of stearic acid, 1 part of an accelerator (zinc salt of mercaptobenzothiazol), 0.5 part of an antioxidant (phenyl beta-naphthylamine), and 1.5 parts of sulfur were milled at 40° C. on a rubber mill until a homogeneous product was obtained. A portion of this blend was extruded through a Royle stuffing machine to form a tube having 0.125 inch wall and 0.5 inch inside diameter. After curing for 50 minutes at 153° C. the tubing was very flexible, strong, and resilient.

A second portion of the above blend was press-cured into 3 x 6 inch sheets by pressing for 30, 60 and 90 minutes respectively, at 153° C. under 60 lbs./sq. in. pressure. The sheets were homogeneous, pliable, and strong.

*Example II*

Fifteen (15) parts of polyhexamethylene adipamide and 5 parts of peptized rubber were fused at 275° C. and stirred until a homogeneous melt resulted. When allowed to cool, the blend set to a tough, amber solid melting at 240°–245° C. when tested in the open air on a copper block. A portion of this composition was molded at 245° C. between aluminum plates into a strong, pliable film.

By "peptized rubber" is meant rubber plasticized by means of chemical agents such as unsymmetrical substituted hydrazines, alpha-nitroso-beta-naphthol and thiophenols. Peptized rubber of this type is disclosed in Williams and Smith Patents 2,018,643, 2,018,644, 2,018,645, and 2,132,505.

*Example III*

A polyamide interpolymer was prepared by heating equimolecular amounts of hexamethylene diammonium adipate and decamethylene diammonium sebacate at 230°–250° C. under conditions permitting the removal of water formed during the reaction, until the polymer had an intrinsic viscosity of about 1.0. Ten (10) parts of this interpolymer and 10 parts of a 30-minute milled rubber were fused with stirring at 200° C. until a homogeneous viscous melt resulted. A portion of this blend was molded at 160° C. between aluminum sheets to a clear, rubbery, extremely pliable film. The blend was soft and capable of being extruded into tubing. When worked on rubber rolling mills, it behaved much like unmodified rubber. The molded film absorbed 0.4 and 3.1% moisture when allowed to come to equilibrium at 50 and 100% relative humidities, respectively, as compared to an absorption of 1.8 and 5.8% for an unmodified interpolymer of similar constitution.

It is to be understood that the aforementioned examples are merely illustrative of the compositions of this invention and their manner of preparation. As examples of additional synthetic linear condensation polyamides which can be modified by the addition of polymeric aliphatic hydrocarbons may be mentioned polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-p-xylylene sebacamide, poly-phenylene diacetamide, and the polyamide derived from 3,3'-diaminodipropyl ether and adipic acid. Polymerized 6-aminocaproic acid (e. g., as obtained from the acid or its lactam), polymerized 9-aminononanoic acid, and polymerized 11-aminoundecanoic acid are additional examples of linear superpolymers which may be used. As illustrated in Example III, interpolyamides can likewise be modified by polymeric hydrocarbons. The invention is also applicable to mixtures of polyamides. In general, the synthetic linear superpolymers do not possess fiber-forming properties unless they have an intrinsic viscosity above 0.4, where intrinsic viscosity (a measure of molecular weight) is defined as in U. S. 2,130,948. Likewise, to be useful in making films, ribbons, tubes, rods, etc., the polyamide should have an intrinsic viscosity above 0.4 and preferably above 0.6.

Instead of the polyamides mentioned above which are obtainable from bifunctional polyamide-forming reactants, as essentially sole reactants, I may use the linear superpolymers obtained by including with the polyamide-forming reactants used to prepare the polyamide, other bifunctional reactants such as glycols and hydroxy acids. As examples of such modified polyamides may be mentioned those derived from diamines, dibasic acids and glycols (as in Example I); those derived from diamines, dibasic acids and hydroxy acids; those derived from amino acid, dibasic acids and glycols; and those derived from amino acids and hydroxy acids. Although these products contain ester linkages, they can still be referred to as polyamides, since they contain a plurality of amide linkages and retain many of the desirable properties of the simple polyamides. Like the simple polyamides these modified polyamides do not exhibit fiber-forming properties until their intrinsic viscosity is at least 0.4.

Other examples of the materials used in this invention are gutta percha, balata, polymerized isobutylene, polymeric butadiene, and polymerized chloroprene.

The present compositions may contain various additional modifying agents, for example, luster modifying materials, pigments, dyes, antioxidants, oils, antiseptics, cellulose derivatives, etc. Particularly desirable compositions are obtained by including a phenol or a sulfonamide, as for instance, butyl phenol or p-toluene sulfonamide, as plasticizers. In certain instances, it is advantageous to include other polymeric hydrocarbons, such as polystyrene. Likewise, paraffin may also be included.

Typical applications of the products of this invention are yarns, fabrics, bristles, surgical sutures, dental floss, fish lines, fishing leaders, rods, tubes, films, ribbons, sheets, safety glass interlayers, electrical insulation, molded articles, adhesives, impregnating agents, and coating compositions. An advantage which these compositions have over unmodified polyamides is that they are less permeable to moisture and oil. Owing to this improved moisture and oil resistance, the products are especially useful in the form of films. Typical uses for the material in this form are wrapping foils, casings for sausages and other foods, and oil and milk containers. The low moisture permeability makes the compositions of special interest for electrical insulation, e. g. coating wires for dynamite leg wire, armature windings, induction coils, relay switches, and as a protective coating for electrical instruments. By reason of the fact that the new compositions may be melted and thus extruded, they can be formed into tubing, and beading applicable to many uses. Hollow tubing thus formed, due to its oil resistance is valuable for use with oil and hydrocarbons, for instance as gasoline hose. As in the case of unmodified polyamides, these compositions are also useful in the preparation of blown articles such as toys, hollow toilet ware, etc. Furthermore they may be compression molded, i. e. blanked or stamped out into shaped articles.

Owing to the great toughness, pliability and plastic characteristics of superpolymers, they may be machined, tooled and calendered. The addition of polymeric aliphatic hydrocarbons to superpolymers does not interfere with their ability to be tooled and machined. At slightly elevated temperatures the superpolymer-polymeric hydrocarbon compositions may be worked on rolling mills and calendering rolls in much the same manner as rubber is treated. This ability of superpolymer-polymeric hydrocarbon compositions to be milled and worked provides an excellent method for incorporating pigments, colors, fibers, and the like. The materials may also be pressed into cakes and then sliced into thin sheets and films by means of a suitable sheeting knife.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polymeric amide and rubber in amount of from 1% to equal parts by weight of said polymeric amide.

2. A composition of matter comprising a synthetic linear polymeric amide and from 1% to equal parts by weight of said polymeric amide of a rubbery material selected from the class consisting of rubber, gutta percha, balata, polymerized isobutylene, polymeric butadiene and polymerized chloroprene.

3. The composition set forth in claim 2 in which said polymeric amide has an intrinsic viscosity of at least 0.4 and is the reaction product of a polyamide-forming composition which comprises a diamine and a dibasic carboxylic acid.

4. The composition set forth in claim 2 in which said polymeric amide has an intrinsic viscosity of at least 0.4 and is the reaction product of a polyamide-forming composition which comprises a monoaminomonocarboxylic acid.

HARRY B. DYKSTRA.